(12) United States Patent
Hodjat

(10) Patent No.: US 9,097,297 B1
(45) Date of Patent: Aug. 4, 2015

(54) HYDRAULIC ISOLATOR DECOUPLER

(71) Applicant: THE GATES CORPORATION, Denver, CO (US)

(72) Inventor: Yahya Hodjat, Oxford, MI (US)

(73) Assignee: Gates Corporation, Denver, CO (US)

( * ) Notice: Subject to any disclaimer, the term of this patent is extended or adjusted under 35 U.S.C. 154(b) by 8 days.

(21) Appl. No.: 14/158,413

(22) Filed: Jan. 17, 2014

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| F16D 3/00 | (2006.01) |
| F16H 55/14 | (2006.01) |
| F16H 55/36 | (2006.01) |
| F16D 41/069 | (2006.01) |
| F02B 67/06 | (2006.01) |

(52) U.S. Cl.
CPC .............. *F16D 41/069* (2013.01); *F02B 67/06* (2013.01); *F16H 55/36* (2013.01); *F16H 2055/366* (2013.01)

(58) Field of Classification Search
CPC ...... B62M 25/08; B62M 9/122; B62M 9/132; F16H 55/36; F16H 2055/366
USPC ..................................................... 474/70, 94
See application file for complete search history.

(56) References Cited

U.S. PATENT DOCUMENTS

| 70,059 | A | * | 10/1867 | Wilber ............................ 192/46 |
| 688,644 | A | * | 12/1901 | Houghtaling ................... 192/46 |
| 709,900 | A | * | 9/1902 | Gurney et al. .................. 192/46 |
| 756,086 | A | * | 3/1904 | Weiler ............................. 192/46 |
| 951,882 | A | * | 3/1910 | Goldberg ........................ 192/46 |
| 1,396,343 | A | * | 11/1921 | Richardson ..................... 192/46 |
| 1,900,957 | A | * | 3/1933 | Herbert et al. .................. 192/46 |
| 2,035,891 | A | * | 3/1936 | Jeffrey ...................... 235/144 M |
| 2,308,926 | A | * | 1/1943 | Kreis .............................. 192/46 |
| 2,525,817 | A | * | 10/1950 | MacAdams ..................... 310/69 |
| 2,678,708 | A | * | 5/1954 | Schill ............................. 192/46 |
| 2,735,526 | A | * | 2/1956 | Gemmel ......................... 192/28 |
| 2,794,524 | A | | 6/1957 | Sacchini et al. |
| 2,996,241 | A | * | 8/1961 | Hoffmann ..................... 235/1 C |
| 3,300,003 | A | * | 1/1967 | Peterson et al. ................ 192/46 |
| 3,486,597 | A | * | 12/1969 | Carlton ........................... 192/46 |
| 3,667,307 | A | * | 6/1972 | Kelch ............................. 74/126 |
| 4,126,214 | A | * | 11/1978 | Kiss ............................... 192/36 |

(Continued)

FOREIGN PATENT DOCUMENTS

| WO | 2006001337 A1 | 1/2006 |
| WO | 2007003052 A1 | 1/2007 |
| WO | 2012152757 A1 | 11/2012 |

OTHER PUBLICATIONS

European Patent Office, International Search Report, Mailing date Mar. 26, 2015, International Application No. PCT/US2015/010865.

*Primary Examiner* — Henry Liu
(74) *Attorney, Agent, or Firm* — Jeffrey A. Thurnau, Esq.; Paul N. Dunlap, Esq.

(57) ABSTRACT

An isolator decoupler comprising a shaft having a shaft projection, a pulley having a pulley projection, the pulley journalled to the shaft, a member pivotally connected to the shaft, the member alternatively engagable with the shaft projection or with the pulley projection, engagement with the pulley by the member causes locked rotation of the shaft with the pulley, and a viscous fluid between the shaft and the pulley, the member immersed in said viscous fluid.

11 Claims, 2 Drawing Sheets

(56) References Cited

U.S. PATENT DOCUMENTS

| | | | | |
|---|---|---|---|---|
| 4,262,786 | A | * | 4/1981 | Taylor .......................... 192/46 |
| 4,473,742 | A | * | 9/1984 | Smilgys .................... 235/144 D |
| 4,548,316 | A | * | 10/1985 | Maurer .................... 198/832.2 |
| 4,854,191 | A | * | 8/1989 | Nagano ........................ 475/289 |
| 4,889,325 | A | * | 12/1989 | Flower et al. ............ 267/140.13 |
| 5,088,581 | A | * | 2/1992 | Duve ............................. 192/46 |
| 5,257,685 | A | * | 11/1993 | Tichiaz et al. .................. 192/46 |
| 5,879,254 | A | * | 3/1999 | Tanaka ........................... 474/74 |
| 6,089,112 | A | | 7/2000 | Kelly et al. |
| 6,116,394 | A | | 9/2000 | Ruth |
| 6,148,979 | A | * | 11/2000 | Roach et al. ................. 192/45.1 |
| 6,905,009 | B2 | * | 6/2005 | Reed et al. ................... 192/43.1 |
| 7,100,756 | B2 | * | 9/2006 | Kimes et al. .................... 192/46 |
| 7,191,880 | B2 | * | 3/2007 | Liston et al. .................. 192/41 S |
| 7,198,587 | B2 | * | 4/2007 | Samie et al. ................... 475/285 |
| 7,383,930 | B2 | * | 6/2008 | Kimes et al. .................... 192/46 |
| 7,448,481 | B2 | * | 11/2008 | Kimes et al. .................... 192/46 |
| 7,451,862 | B2 | * | 11/2008 | Kimes et al. .................... 192/46 |
| 7,455,156 | B2 | * | 11/2008 | Kimes et al. .................... 192/46 |
| 7,661,518 | B2 | * | 2/2010 | Kimes ............................. 192/46 |
| 7,766,774 | B2 | * | 8/2010 | Antchak et al. .................. 474/74 |
| 7,770,706 | B2 | | 8/2010 | Cali et al. |
| 7,849,989 | B2 | * | 12/2010 | Ogata et al. ............... 192/45.018 |
| 7,878,315 | B2 | * | 2/2011 | Saito et al. ................... 192/41 S |
| 8,006,819 | B2 | | 8/2011 | Dell et al. |
| 8,177,669 | B2 | * | 5/2012 | Ishida et al. ..................... 474/94 |
| 8,297,421 | B2 | * | 10/2012 | Mankame et al. ............... 192/46 |
| 8,337,077 | B2 | * | 12/2012 | Giacobino .................... 368/206 |
| 8,820,502 | B2 | * | 9/2014 | Chang et al. ............. 192/45.018 |
| 8,863,925 | B2 | * | 10/2014 | Antchak et al. ............. 192/41 S |
| 8,888,622 | B2 | * | 11/2014 | Chen et al. ....................... 474/94 |
| 2002/0058558 | A1 | * | 5/2002 | Patterson et al. ................ 474/82 |
| 2004/0180742 | A1 | * | 9/2004 | Ichihara et al. .................. 474/70 |
| 2006/0021835 | A1 | * | 2/2006 | Kimes et al. .................... 192/46 |
| 2006/0021836 | A1 | * | 2/2006 | Kimes et al. .................... 192/46 |
| 2006/0021837 | A1 | * | 2/2006 | Kimes et al. .................... 192/46 |
| 2006/0021838 | A1 | * | 2/2006 | Kimes et al. .................... 192/46 |
| 2006/0021839 | A1 | * | 2/2006 | Kimes et al. .................... 192/46 |
| 2006/0021841 | A1 | * | 2/2006 | Kimes et al. .................... 192/46 |
| 2006/0185957 | A1 | * | 8/2006 | Kimes et al. .................... 192/46 |
| 2007/0089958 | A1 | * | 4/2007 | Kanehisa ........................ 192/64 |
| 2007/0089959 | A1 | * | 4/2007 | Kanehisa ........................ 192/64 |
| 2007/0089960 | A1 | * | 4/2007 | Kanehisa ........................ 192/64 |
| 2007/0131509 | A1 | * | 6/2007 | Kimes ............................. 192/46 |
| 2008/0047796 | A1 | * | 2/2008 | Ogata et al. ..................... 192/45 |
| 2009/0124400 | A1 | * | 5/2009 | Mikami ......................... 464/182 |
| 2009/0176608 | A1 | * | 7/2009 | Jansen et al. .................... 474/74 |
| 2010/0000091 | A1 | * | 1/2010 | Saito et al. ....................... 29/898 |
| 2010/0288593 | A1 | * | 11/2010 | Chiesa et al. .................... 192/46 |
| 2011/0108383 | A1 | * | 5/2011 | Savu et al. ....................... 192/45 |
| 2011/0114434 | A1 | * | 5/2011 | Mankame et al. ............... 192/35 |
| 2011/0224038 | A1 | * | 9/2011 | Aantchak et al. ............... 474/94 |
| 2011/0290608 | A1 | | 12/2011 | Bird et al. |
| 2012/0138411 | A1 | * | 6/2012 | Samie et al. ................. 192/85.01 |
| 2012/0295746 | A1 | * | 11/2012 | Cali et al. ........................ 474/94 |
| 2013/0087428 | A1 | * | 4/2013 | Antchak et al. ............. 192/41 S |
| 2013/0098733 | A1 | * | 4/2013 | Antchak et al. ............. 192/41 S |
| 2013/0267361 | A1 | * | 10/2013 | Cali et al. ........................ 474/70 |
| 2013/0345004 | A1 | * | 12/2013 | McCrary ....................... 474/148 |
| 2014/0080646 | A1 | * | 3/2014 | Goujon et al. ................. 474/166 |
| 2014/0083809 | A1 | * | 3/2014 | Shimozaki ...................... 192/46 |

\* cited by examiner

HYDRAULIC ISOLATOR DECOUPLER

FIELD OF THE INVENTION

The invention relates to an isolator decoupler, and more particularly, to a hydraulic isolator decoupler comprising a member pivotally connected to the shaft, the member alternatively engagable with the shaft projection or with the pulley projection, engagement with the pulley by the member causes locked rotation of the shaft with the pulley, and a viscous fluid between the shaft and the pulley, the member immersed in said viscous fluid.

BACKGROUND OF THE INVENTION

Overrunning decouplers for serpentine drives used on internal combustion engines are well known. They operate to reduce torsional vibrations in the serpentine drive caused by operation of the engine.

Decouplers typically include a one way clutch, which operates so the decoupler only transmits torque in one rotational direction. They also include an isolation spring which operates to dampen the torsional vibrations between the decoupler pulley and the accessory device driven by the pulley.

Decouplers are typically installed on the alternator or crankshaft of an internal combustion engine because the alternator has the highest inertial load of the accessories driven by the serpentine drive.

Use of an isolating decoupler involves advantages such as increasing the life of the serpentine belt and decreasing the spring force requirements of the belt tensioner for the serpentine system. It can also increase the operating life of the alternator.

Representative of the art is U.S. Pat. No. 8,006,819 which discloses an overrunning accessory decoupler with a locking mechanism which provides the desired overrunning accessory decoupler functionality and also permits torque to be transferred from the accessory to which the decoupler is installed to the drive of the engine when desired. In one embodiment, the decoupler includes a locking mechanism that is controlled by centrifugal forces developed in the decoupler to lock the decoupler to permit the accessory to transfer torque to the drive to start or boost the engine.

What is needed is an isolator decoupler comprising a member pivotally connected to the shaft, the member alternatively engagable with the shaft projection or with the pulley projection, engagement with the pulley by the member causes locked rotation of the shaft with the pulley, and a viscous fluid between the shaft and the pulley, the member immersed in said viscous fluid. The present invention meets this need.

SUMMARY OF THE INVENTION

An aspect of the invention is to provide an isolator decoupler comprising a member pivotally connected to the shaft, the member alternatively engagable with the shaft projection or with the pulley projection, engagement with the pulley by the member causes locked rotation of the shaft with the pulley, and a viscous fluid between the shaft and the pulley, the member immersed in said viscous fluid.

Other aspects of the invention will be pointed out or made obvious by the following description of the invention and the accompanying drawings.

The invention comprises an isolator decoupler comprising a shaft having a shaft projection, a pulley having a pulley projection, the pulley journalled to the shaft, a member pivotally connected to the shaft, the member alternatively engagable with the shaft projection or with the pulley projection, engagement with the pulley by the member causes locked rotation of the shaft with the pulley, and a viscous fluid between the shaft and the pulley, the member immersed in said viscous fluid.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
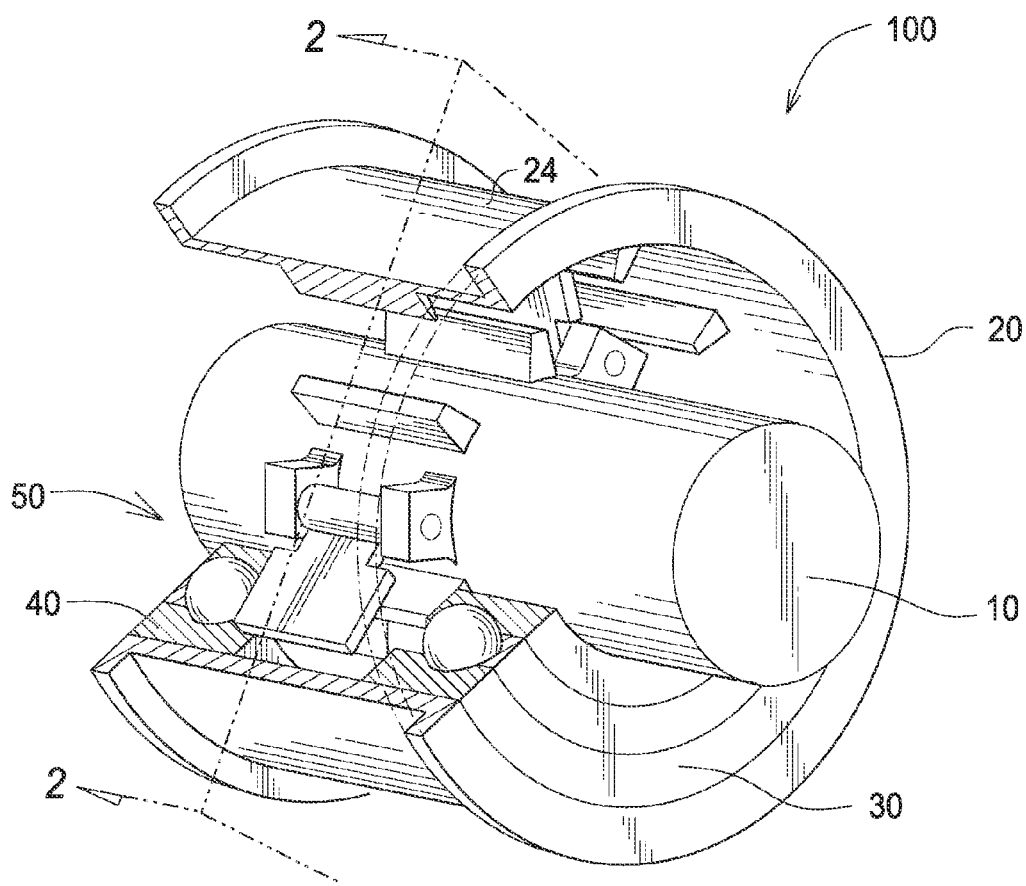
FIG. 1 is a perspective cutaway view of the inventive device.

FIG. 1 is a perspective cutaway view of the inventive device. The inventive hydraulic isolator decoupler comprises shaft 10 and pulley 20. Pulley 20 is journalled to shaft 10 by a bearing 30 and bearing 40. A belt (not shown) engages an outer surface 24 of pulley 20. The inventive device may be used on an alternator shaft in a belt driven accessory drive for an internal combustion engine (not shown), or may also be used on an engine crankshaft.

A plurality of gate mechanisms 50 are disposed about the outer circumference of shaft 10 in hinged attachment to shaft 10. A gate member 51 is hinged by pin 53 to a base 52. Base 52 is attached to shaft 10. Gate 51 freely pivots about pin 53. Gates 51 may comprise metal, plastic or any other suitably rigid material.

Radial projections or protrusions 54 protrude radially outward from shaft 10. A radial projection 54 is disposed on each side of a gate base 52 in order that a gate 51 may bear upon and be supported by a radial projection 54 during shaft rotation in a predetermined direction. The number of projections 54 can be varied and will influence the time required for each gate 51 to "lay down" and thereby effect decoupling. The radial height of each projection 54 can be varied and will also influence the timing and effect of decoupling of each gate 51, that is, the time required to "lay down" when decoupling is occurring. "Decoupling" occurs when shaft 10 overruns pulley 20 and each gate 51 is disengaged from each projection 22.

The inventive device will operate without projections 54 wherein each gate simply contacts shaft 10 or an adjacent base 52 in the overrun condition.

Radial projections or protrusions 22 protrude radially inward from pulley surface 21. The number of projections 22 may vary. The greater the number of gates 51 the more quickly the device will "lock-up" during a load reversal since the angular spacing between each gate is a function of the number of gates divided by 360°. Projections 22 are aligned to engage a gate 51 when the device is transmitting torque from pulley 20 to shaft 10. Typically, a belt (not shown) will engage pulley 20.

Figure 3:
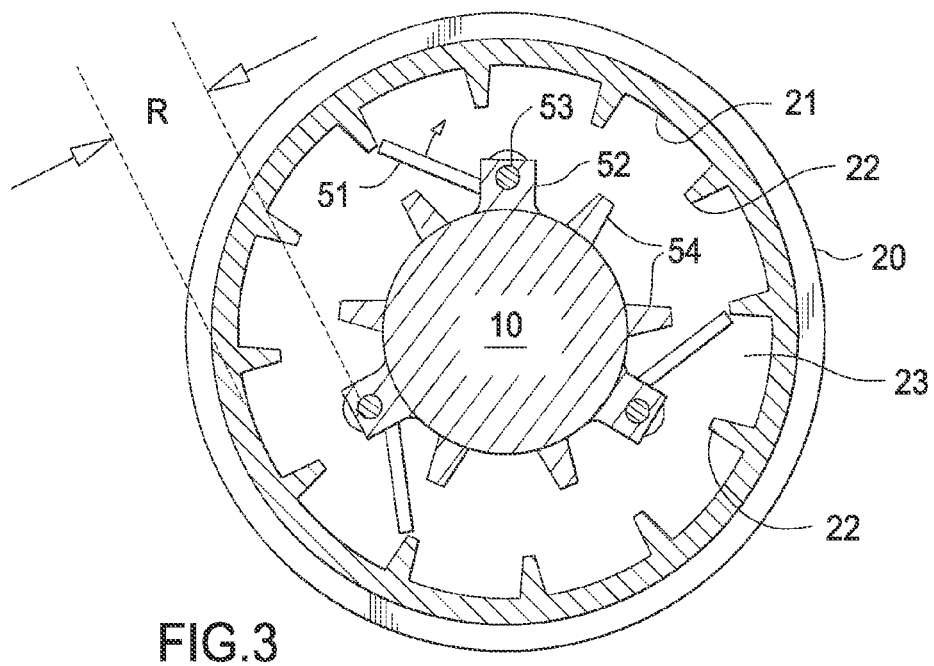
FIG. 3 is a cross-sectional view.

The length of a gate 51 is greater than the radial distance (R) from pin 53 to inner surface 21, see FIG. 3. This prevents gate 51 from overrotating past pulley 20 and thereby allowing shaft 10 to freely rotate more than 360 degrees with respect to pulley 20 in either direction. Namely, shaft 10 is only allowed to rotate with respect to pulley 20 through only a partial rotation in one direction (during the locked or lock up condition) and through greater than 360 degrees in a second direction (during the overrun condition). This mechanism and its operation may also be operationally referred to as a one-way clutch.

Each gate 51 may be smaller in surface area than each projection 54 or 22. Each gate 51 may comprise a triangular cross section while each projection 54, 22 comprises a rectangular shape. The size and surface area of each gate member 51 can be varied depending on the speed with which the re-engagement is intended to occur. Gate 51 may comprise any suitable material including metallic and polymeric, or plastic. A metallic gate may be covered with a layer of elastomeric material which will then diminish the landing impact as the gate engages a projection.

In an alternate embodiment, a plurality of gate mechanisms 50 are disposed about the inner surface 21 of pulley 20 in hinged attachment to pulley 20. Each gate member 51 is hinged by pin 53 to a base 52. Gate 51 freely pivots about pin 53. In operation each gate 51 pivots as described elsewhere in this specification. Further, upon a load reversal each gate 51 pivots into engagement with a shaft radial projection 54, thereby causing locked rotation, namely, no rotational movement of the pulley with respect to the shaft.

Figure 2:
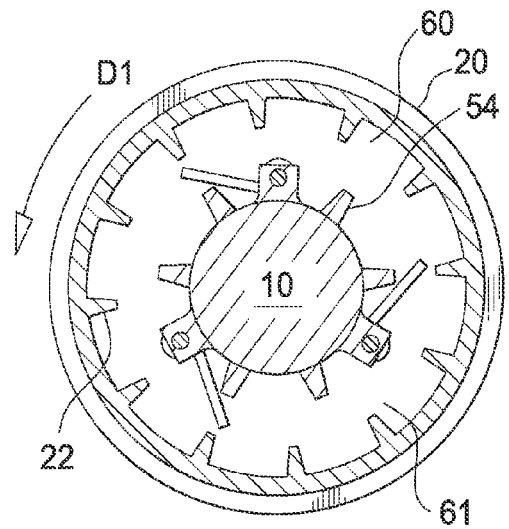
FIG. 2 is a cross-sectional view through 2-2 in FIG. 1.
Figure 5:
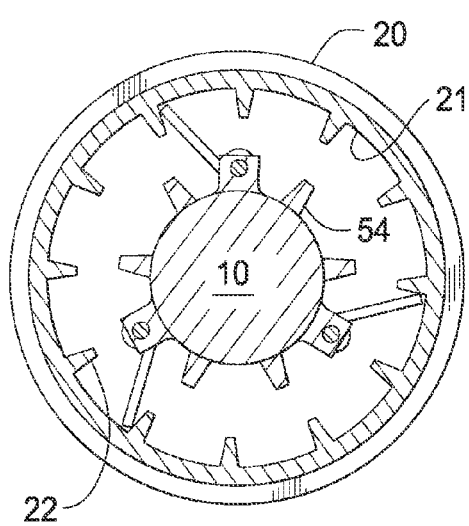
FIG. 5 is a cross-sectional view.
Figure 6:
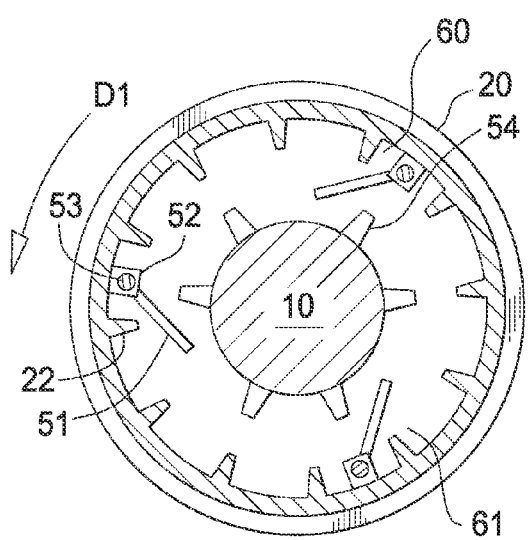
FIG. 6 is a cross sectional view of an alternate embodiment.

FIG. 2 is a cross-sectional view through 2-2 in FIG. 1. Gate 51 is shown in the fully retracted position. This position is typical when pulley 20 is overrotating or overrunning shaft 10 in direction D1. Gates 51 bears upon a radial projection 54. Space 60 between shaft 10 and pulley 20 is filled with a viscous fluid 61 which immerses each gate 51. Depending on the degree of vibration isolation desired, any viscous fluid from low viscosity hydraulic oils to medium and high viscosity oils and greases such as Krytok™ Grease (a high viscosity DuPont high temperature grease) or silicon fluids and silicon grease can be used. The higher the viscosity, the more "cushioned" or "damped" the motion of the viscous fluid 61 and each gate member 51 will be, and subsequently more damping of vibrations will be realized. Higher viscosity fluids also allow a less elaborate sealing system to be used on the outer sides of the bearings 30 and 40. As an example here and not by way of limitation, a grease similar to a grease used in bearings 30, 40, or a silicon fluid can be used, for example, automotive grade lithium grease having NLGI Grade 2, or NLGI Grade 1, or NLGI Grade 1.5. By the nature of the curvature and the presence of the projections 54, 22, gates 51 do not open fully in the drive condition, so that when the reverse flow of the grease starts (overrun condition) it pushes the gates closed. "Open fully" refers to the situation wherein each gate extends along a radial directly away from shaft 10. As shown in FIG. 5, in the drive condition each gate 51 is not fully radially extended because each gate 51 engages a projection 22. Projection 22 may also be coated with an elastomeric material which will diminish the landing impact when a gate 51 engages a projection 22, thereby decreasing wear and noise of operation.

During a reversal each projection 54 and 22 imparts a shear force on the viscous fluid in space 60. The shear force on the viscous fluid damps and cushions operation of the device upon a reversal of the pulley 20 with respect to shaft 10.

FIG. 3 is a cross-sectional view. In FIG. 3 shaft 10 is beginning to drive, thereby causing shaft 10 to rotate past pulley 20. As shaft 10 overrotates pulley 20, gate 51 is engaged with the viscous fluid 60. This causes gate 51 to rotate radially outward toward pulley 20 (see arrow). Gate 51 pivots about pin 53. In this embodiment there are three gates, all of which rotate or pivot radially outward in unison.

Figure 4:
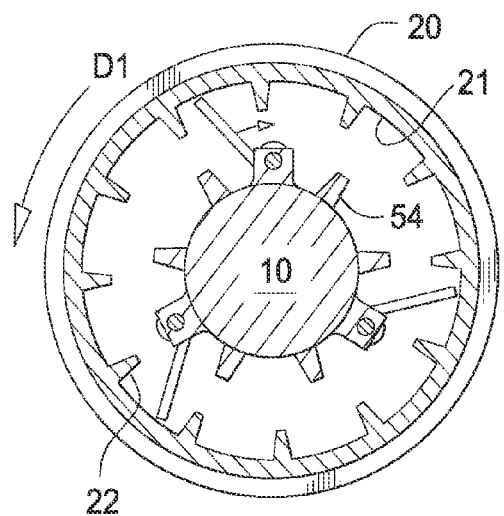
FIG. 4 is a cross-sectional view.

FIG. 4 is a cross-sectional view. Each gate 51 has rotated radially outward to engage surface 21. Shaft 10 continues to overrotate pulley 20.

FIG. 5 is a cross-sectional view. Each gate 51 now engages a projection 22. Once each gate 51 engages a projection 22 the relative rotation of shaft 10 is halted. Shaft 10 now drives pulley 20 through each gate 10, thereby causing shaft 10 to rotate in locked relation with pulley 20.

The inventive device is operable to transmit torque from shaft 10 to pulley 20, or, from pulley 20 to shaft 10. The preceding description considers torque transmission from shaft 10 to pulley 20. It is also operationally possible for pulley 20 to drive shaft 10, for example, when shaft 10 is connected to an alternator (not shown).

Although a form of the invention has been described herein, it will be obvious to those skilled in the art that variations may be made in the construction and relation of parts without departing from the spirit and scope of the invention described herein.

We claim:

1. An isolator decoupler comprising:
a shaft having a shaft projection;
a pulley having a pulley projection;
the pulley journalled to the shaft;
a member pivotally connected to the shaft, the member alternatively engagable with the shaft projection or with the pulley projection, the member comprising an elastomeric coating;
engagement with the pulley by the member causes locked rotation of the shaft with the pulley; and
a viscous fluid between the shaft and the pulley, the member immersed in said viscous fluid such that the viscous fluid urges the member in a predetermined direction; and
the pulley projection engaging the viscous fluid by a shear force to damp an operating condition of the isolator decoupler.

2. The isolator decoupler as in claim 1, wherein the viscous fluid comprises grease.

3. The isolator decoupler as in claim 1 comprising a plurality of members, and a plurality of pulley projections.

4. An isolator decoupler comprising:
a shaft having a shaft radial projection;
a pulley having a pulley radial projection;
the pulley journalled to the shaft on a bearing;
a member capable of pivotal movement connected to the pulley, the member alternatively pivotally engagable with the pulley radial projection and the shaft radial projection;
the member upon engagement with the pulley prevents rotation of the pulley beyond a predetermined position with respect to the shaft; and
a viscous fluid in a space between the shaft and the pulley, the member immersed in said viscous fluid such that the viscous fluid urges the member in a predetermined direction; and
the pulley radial projection engaging the viscous fluid by a shear force to damp an operating condition of the isolator decoupler.

5. The isolator decoupler as in claim 4, wherein the viscous fluid comprises grease.

6. The isolator decoupler as in claim 4 comprising a plurality of members, and a plurality of shaft radial projections.

7. An isolator decoupler comprising:
a shaft;
a pulley;
the pulley journalled to the shaft;

a member pivotally connected to the shaft, the member engagable with the pulley, the member comprising an elastomeric coating;

engagement of the member with the pulley causing locked rotation of the pulley with the shaft; and a viscous fluid disposed between the shaft and the pulley, the member immersed in said viscous fluid such that the viscous fluid urges the member in a predetermined direction.

8. The isolator decoupler as in claim 7, wherein the viscous fluid comprises grease.

9. An isolator decoupler comprising:

a shaft having a shaft projection;

a pulley having a pulley projection;

the pulley journalled to the shaft;

a member pivotally connected to the pulley, the member alternatively engagable with the shaft projection or with the pulley projection;

engagement with the shaft by the member causes locked rotation of the shaft with the pulley; and a viscous fluid between the shaft and the pulley, the member immersed in said viscous fluid such that the viscous fluid urges the member in a predetermined direction; and the pulley projection engaging the viscous fluid by a shear force to damp an operating condition of the isolator decoupler.

10. The isolator decoupler as in claim 9, wherein the viscous fluid comprises grease.

11. The isolator decoupler as in claim 9 comprising a plurality of members, and a plurality of shaft radial projections.

\* \* \* \* \*